United States Patent [19]
Shibuya et al.

[11] Patent Number: 5,727,827
[45] Date of Patent: Mar. 17, 1998

[54] VEHICULAR BUMPER MOUNTING STRUCTURE

[75] Inventors: Akihiro Shibuya; Yasuhisa Egawa, both of Wako, Japan

[73] Assignee: Honda Giken Kogyo Kabushiki Kaisha, Tokyo, Japan

[21] Appl. No.: 679,279

[22] Filed: Jul. 12, 1996

[30] Foreign Application Priority Data

Jul. 14, 1995 [JP] Japan ................................. 7-178832

[51] Int. Cl.$^6$ ................................................. B60R 19/24
[52] U.S. Cl. ................................................. 293/155
[58] Field of Search ...................................... 293/155

[56] References Cited

U.S. PATENT DOCUMENTS

| | | | |
|---|---|---|---|
| 1,704,146 | 3/1929 | Nordgren et al. | 293/155 |
| 4,974,891 | 12/1990 | Furuta | 293/155 |
| 5,080,410 | 1/1992 | Stewart et al. | |
| 5,378,031 | 1/1995 | Ohno et al. | 293/155 |

FOREIGN PATENT DOCUMENTS 1445970  8/1976  United Kingdom .................. 293/155

*Primary Examiner*—Gary C. Hoge
*Attorney, Agent, or Firm*—Armstrong, Westerman Hattori, McLeland & Naughton

[57] ABSTRACT

A vehicular bumper mounting structure including a support for mounting a hollow, transversely extending bumper beam of high tension steel to a side member of the vehicle body. The support includes a support body and an arm member adapted to be mounted to an upper side or a lower side of the support in an overlapping relation thereto. At least one of the support body and the arm member has at an end thereof an extension extending beyond a rear side portion of the bumper beam. Consequently, if a large collision energy is exerted to the bumper beam, which is hollow and hence light in weight, the collision energy is transmitted to at least one of the support body and arm member before the entire bumper beam having a box cross section is largely deformed, whereby the collision energy transmitted to the support can be transmitted to the vehicle body quickly.

8 Claims, 7 Drawing Sheets

VEHICULAR BUMPER MOUNTING STRUCTURE

BACKGROUND OF THE INVENTION

1. Field of the Invention

The present invention relates to an improvement in a vehicular bumper mounting structure and, in particular, to a vehicular bumper mounting structure designed to quickly transmit a collision energy acted upon the bumper to a vehicle body.

2. Description of the Related Art

Conventionally, various vehicular bumper mounting structures are known in which a bumper beam, covered by a bumper face, is mounted through supports to a front or back part of a vehicle body to extend in a transverse direction thereof (hereinafter "vehicle-widthwise direction"). Generally, it is required of bumpers to be capable of absorbing a small collision energy such as of a collision at a low-speed (approx. 8 km/hr or less) and to have good restoration capability. It is also demanded of the bumpers to be light in weight and to have high energy transmission capability.

One example of such bumpers is disclosed in U.S. Pat. No. 5,080,410 entitled "Vehicular Bumper Beam". The latter bumper beam is schematically shown in FIG. 7 and FIG. 8 hereof.

Figure 7:
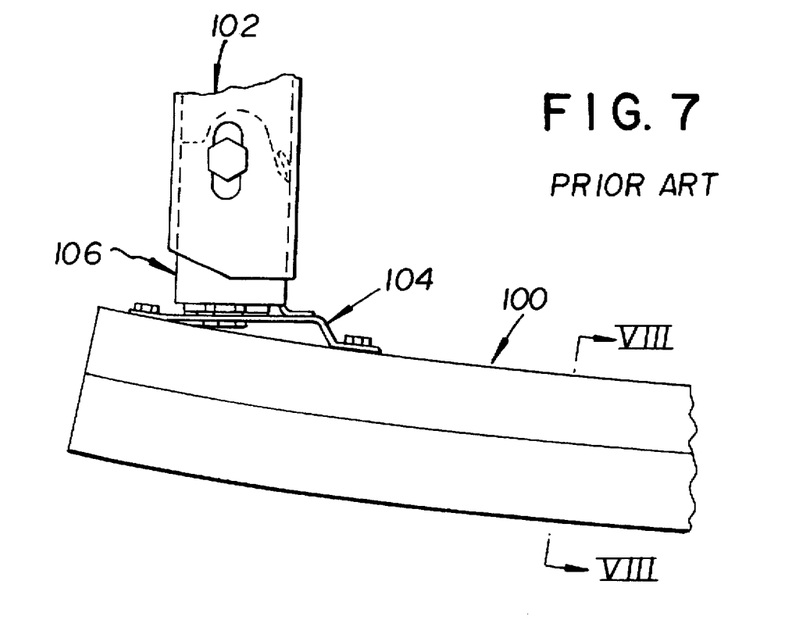
FIG. 7 is a top plan view of a conventional vehicular bumper mounting structure.
Figure 8:
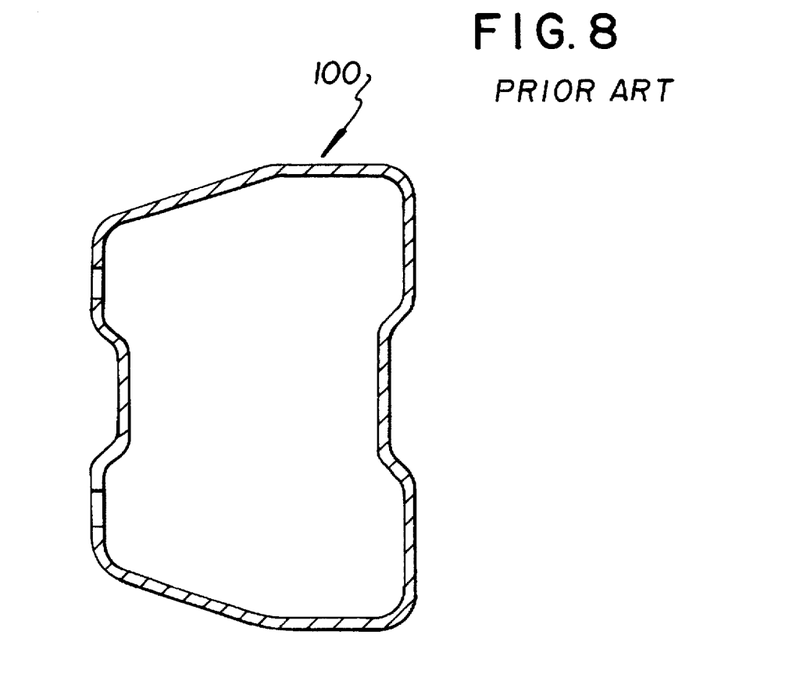
FIG. 8 is a cross-sectional view, taken along line VIII—VIII of FIG. 7, illustrating a section of a bumper beam.

Referring to FIGS. 7 and 8, a bumper beam 100, which is made from a high strength steel material of box-like cross section, is mounted to a front side of a vehicle body by means of a side rail 102 (corresponding to a support). As shown in FIG. 7, the bumper beam 100 is bolt connected at its rear portion through a first bracket 104 and a second bracket 106 to the side rail 102.

It is generally required of bumper beams to be capable of quickly and efficiently transmitting a large collision energy arising as from a collision at a high speed (approx. 8 km/hr or more) to a vehicle body.

However, in the vehicle bumper mounting structure shown in U.S. Pat. No. 5,080,410, the bumper beam 100 is merely bolt connected at its rear portion to the side rail 102. In this arrangement, a large collision energy applied from a fore side of the vehicle body to the bumper is transmitted through the side rail 102 to the vehicle body only when the bumper beam 100 of box-like cross section is largely deformed, whereby quick and efficient energy transmission to the vehicle body is rendered difficult.

It is preferred that the bumper beam 100 is connected to a heightwise center of the side rail 102 so as to achieve efficient transmission of a large collision energy to the vehicle body. However, there are various restrictions inherent to the types of vehicles. Such restrictions may prevent the bumper beam 100 from being positioned at a heightwise center of the side rail 102. Even in this instance, the bumper beam 100 is required to be capable of transmitting a collision energy to the vehicle body quickly and efficiently.

SUMMARY OF THE INVENTION

It is therefore a first object of the present invention to provide an improved vehicular bumper mounting structure which enables quick transmission of a collision energy to a vehicle body.

A second object of the present invention is to provide an improved vehicular bumper mounting structure which is capable of achieving quick and efficient transmission of a collision energy to a vehicle body even when a bumper beam is not positioned at a heightwise center of a support.

The above first object is met by a vehicular bumper mounting structure according to a first aspect of the present invention, which comprises a bumper beam and a support, the bumper beam being in the form of a hollow member made from a high tension steel material, the support being composed of a support body and an arm member fixed to an upper or lower side of a back portion of the support body in an overlapping relation thereto, at least one of the support body and the arm member having a back end extending backwardly beyond a rear side of the bumper beam.

With this arrangement, when a large collision energy acts upon the bumper beam, which takes the form of a hollow member made from a high tension steel material and hence is light in weight, the collision energy is transmitted to the back end of at least one of the support body and the arm member before the bumper beam of box-like cross section is largely deformed. Thus, the collision energy transmitted to the support is quickly transmitted to the vehicle body.

Best timed transmission of the collision energy to the vehicle body may be set by simply changing the length of the back end of the support body or the arm member, which extends backwardly beyond the rear side of the bumper beam.

The above-mentioned second object is met by a vehicular bumper mounting structure comprising a support mounted to a side member of a vehicle body and a bumper beam mounted to the support in an upwardly or downwardly offset relation thereto, the bumper beam being in the form of a hollow member made from a high tension steel, the support having an arm member extending through a space provided by such offset to the bumper beam to support the latter.

By thus effectively utilizing the space provided on the support side by offsetting of the bumper beam, the arm member is arranged to extend from the support to increase rigidity of the latter. As a result, despite the bumper beam being mounted to the support in an upwardly or downwardly offset relation thereto (positioned off a heightwise center), a large collision energy can be transmitted to the vehicle body quickly and efficiently.

The arm member and support may be formed separately to thereby render the support simple in shape and hence easy to manufacture.

BRIEF DESCRIPTION OF THE DRAWINGS

A preferred embodiment of the present invention will hereinafter be described, by way of example only, with reference to the accompanying drawings, in which.

DETAILED DESCRIPTION OF THE PREFERRED EMBODIMENT

The terms "front", "back", "left", "right", "up" and "down" used herein represent directions as viewed from a vehicle driver. In the drawings, the characters "Fr", "Rr", "L" and "R" respectively represent front, rear, left and right sides. "CL" represents a transverse center of a vehicle.

Figure 1:
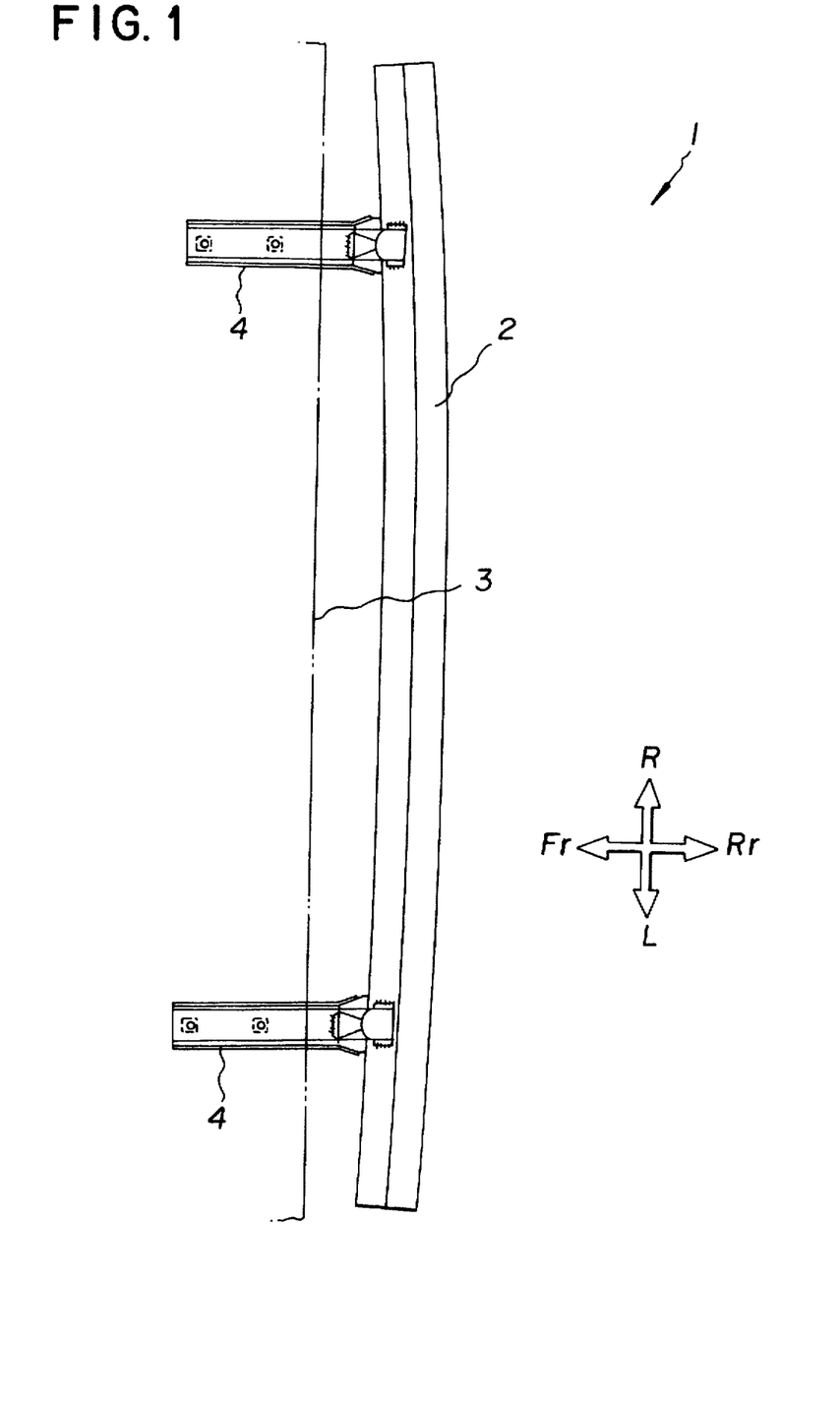
FIG. 1 is a schematic top plan view of a vehicular bumper mounting structure according to the present invention, associated with a rear bumper as an example.

Shown in FIG. 1 is a rear bumper to be mounted to a back side of a vehicle body 3. A bumper 1 includes a bumper beam 2 extending in a vehicle-widthwise direction (up-and-down direction in FIG. 1), a bumper face 6 (discussed in relation to FIG. 3) for covering a back side of the bumper beam 2, and a pair of right and left supports 4, 4 for fixing the vehicle-widthwise ends of the bumper beam 2 to the vehicle body 3. The bumper beam 2 is bent backwardly and thus has an arc shape.

Figure 2:
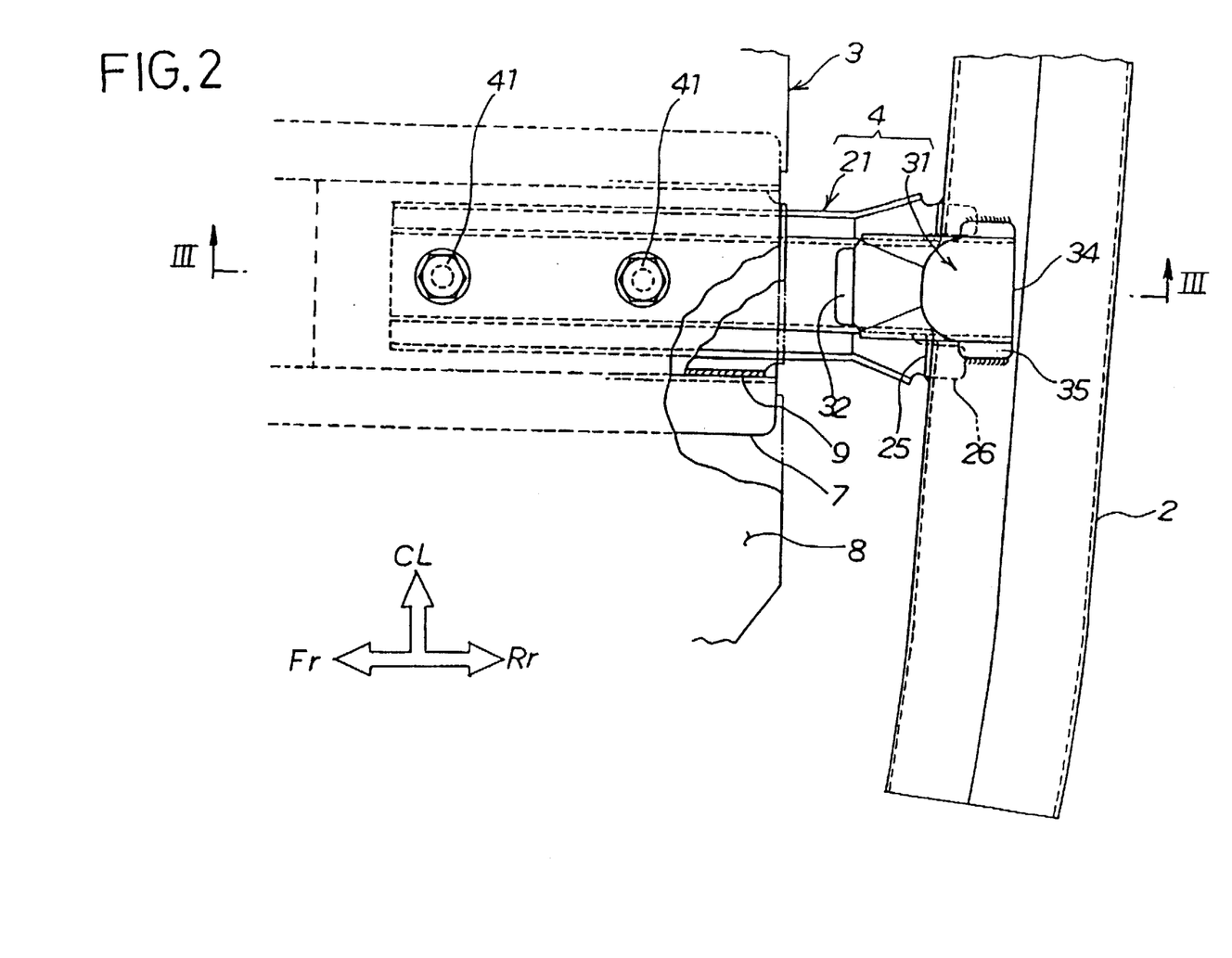
FIG. 2 is a top plan view showing, on an enlarged scale, details of a left part of the vehicular bumper mounting structure of FIG. 1.

Turning to FIG. 2, there is shown a vehicle-widthwise left portion of the mount structure for the bumper beam 2, as seen from above a floor of the vehicle body 3. Left and right portions of the bumper mount structure are symmetrical. Although only the left portion of the bumper mount structure will be discussed hereinbelow, operation and arrangement of the right portion of the bumper mount structure are the same as those of the left portion of the bumper mount structure.

Bumper beam 2 takes the form of a rectangular hollow member made of high tension steel so that it can absorb a collision energy or otherwise well transmit the collision energy to the vehicle body while it is light in weight.

High tension steel is meant to be a steel material having high tensile strength. Weldability and processing characteristics are important factors in selecting such materials. The high tension steel for use in the embodiment discussed herein may be a cold rolled steel plate for automobile construction (AISI •120XF). "AISI" represents the American Iron and Steel Institute.

Figure 3:
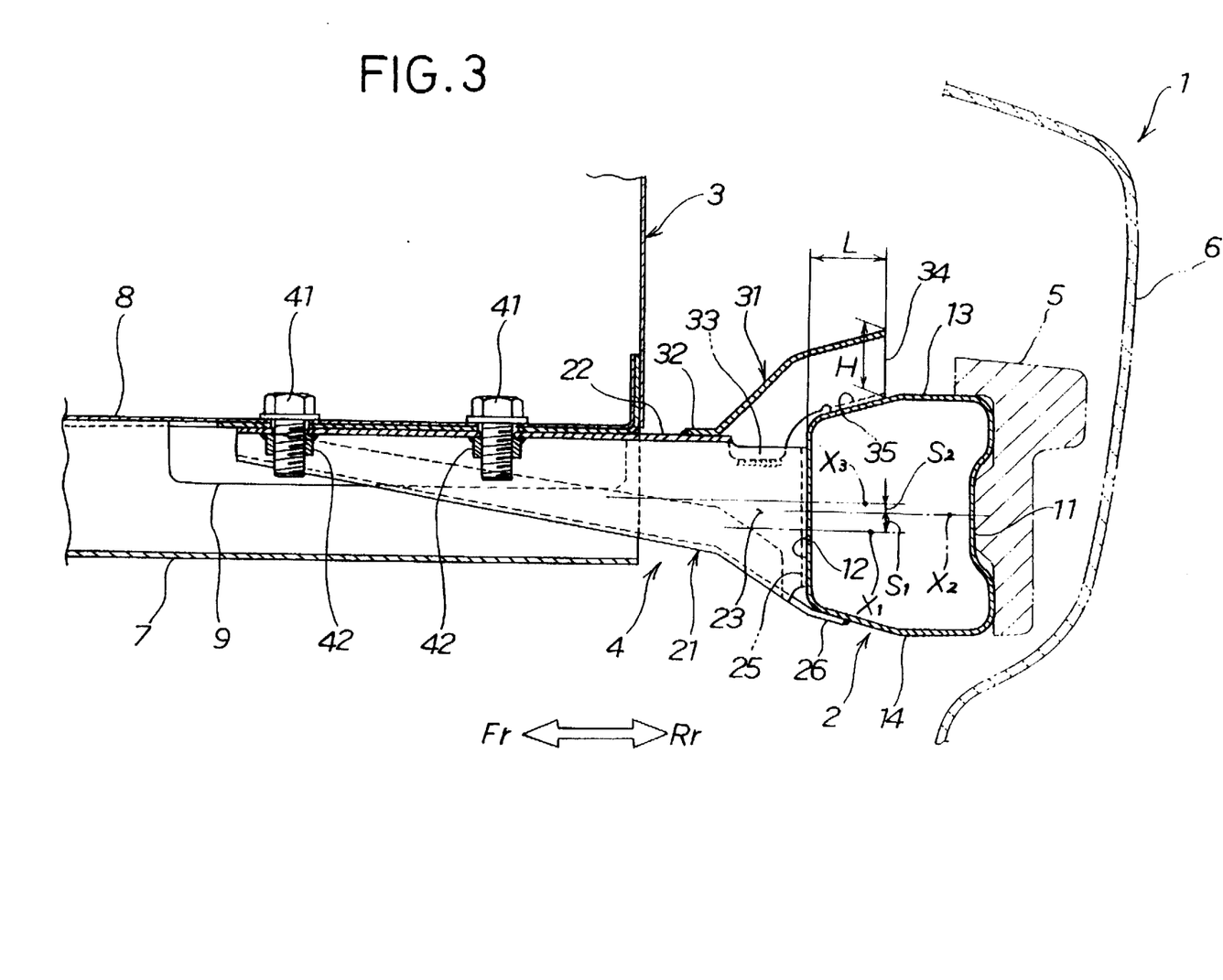
FIG. 3 is a cross-sectional view taken along line III—III of FIG. 2.

As shown in FIG. 3, the bumper beam 2 has a back side covered by a cushion 5. A back side of the cushion 5 is covered by a bumper face 6.

The cushion 5 is provided for absorbing a collision energy and made from a foam material such as polypropyrene. The bumper face 6 is provided for the sake of aesthetics of the bumper 1 and made from, e.g., plastic materials.

The bumper beam 2 is comprised of a hollow member having a substantially rectangular cross section defined by a back side portion 11 opposite from the vehicle body 3, a rear side portion 12 (left side portion in FIG. 3) proximate to the vehicle body 3, an upper side portion 13 and a lower side portion 14. The hollow member is formed by folding a steel plate and weld connected at a heightwise center of the back side portion 11.

The support 4 has a back portion (end portion on the right in FIG. 3) weld connected to the bumper beam 2 and a front portion connected to a back end of a side member 7 by means of bolts 41, 41. The side member (side frame) 7 extends in a front-to-back direction on each side of the vehicle body 3 and forms part of the latter.

The bumper beam 2, which is mounted to the support 4 in an upwardly offset relation thereto, is also supported by an arm member 31 extending backwardly from an upper side of a support body 21 of the support 4. The offset dimension between the center $X_1$ of the support body 21 and the center $X_2$ of the bumper beam 2 is $S_1$. The bumper beam 2 is offset downwardly with respect to the side member 7. The offset dimension between the center $X_2$ of the bumper beam 2 and the center $X_3$ of the side member 7 is $S_2$. The support 2 is thus comprised of the support body 21 and the arm member 31 laid upon an upper side of the back portion of the support body 21.

The arm member 31 is formed separately from the support body 21 and has an upper flange 32 weld connected to an upper wall 22 of the support body 21 and a back side wall 33 connected to a side wall 23 of the support body 21. A back end portion 34 of the arm member 31 extends backwardly (rightward in FIG. 3) beyond the rear side portion 12 of the bumper beam 2 by a predetermined length of extension L. A lower flange 35 of the back end portion 34 is weld connected to the upper side portion 13 of the bumper beam 2.

Height H of the back end portion 34 of the arm member 31 is fixed taking the offset dimensions $S_1$ and $S_2$ into consideration and may preferably be about two to four times the offset dimension $S_1$. The arm member 31 is designed to have a length of extension L that enables transmission of a collision energy from the bumper beam 2 to the side member 7 at best timing. The arm member 31 may be formed integrally with the support body 21.

Side flange 25 of the back end portion of the side wall 23 of the support body 21 is weld connected to the rear side portion 12 of the bumper beam 2. Lower flange 26 of the back end portion of the support body 21 is weld connected to the lower side portion 14 of the bumper beam 2.

At the back portion of the vehicle body 3, the side member 7 has an upwardly-oriented channel configuration and carries thereon a rear floor panel 8 fixedly connected thereto. Between the side walls of the side member 7, there is provided a mount seat 9 of a downwardly-oriented channel configuration. The front portion of the support body 21 is connected through the mount seat 9 to the side member 7 by means of bolts 41 and 41.

Figure 4:
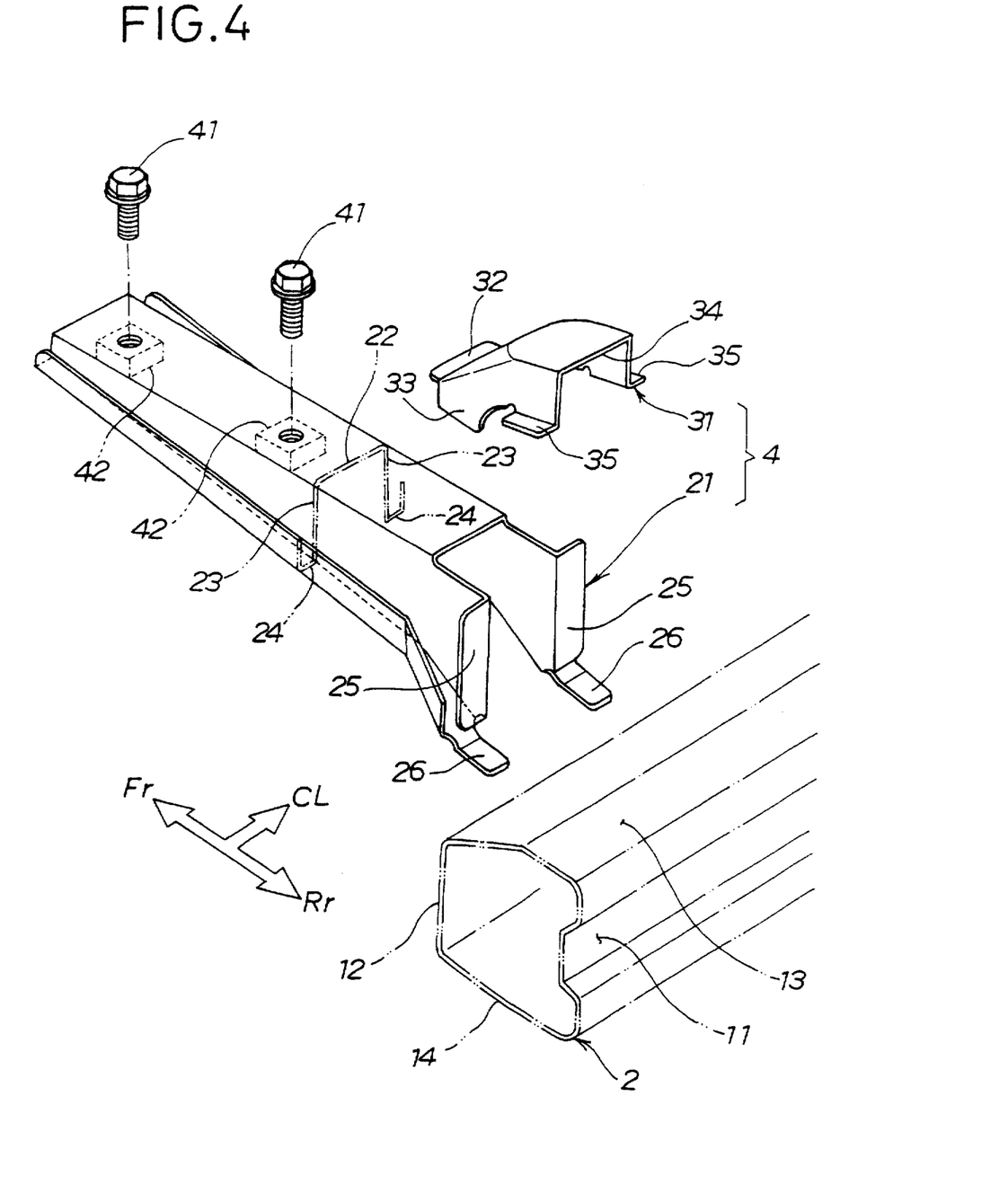
FIG. 4 is an exploded perspective view illustrating the details of the support according to the present invention.

Referring to FIG. 4, the support body 21 has a hat-like cross section defined by the upper wall 22, side walls 23 and 23, and edges 24 and 24 folded over so as to provide increased rigidity thereto, as shown by phantom lines. The support body 21 is formed by folding a steel plate to have the side walls 23, 23 diverging in a backward direction (rightward direction in FIG. 4). The support body 21 has side flanges 25, 25 provided at back ends of the side walls 23, 23, and lower flanges 26, 26 projecting backwardly from the edges 24, 24.

Designated by reference numerals 42, 42 are nuts weld connected to the front portion of the upper wall 22 of the support body for threaded engagement with the bolts 41, 41.

The arm member 31 has a downwardly-oriented channel cross section and is formed by folding a steel plate such that it extends from the back portion of the upper wall 22 of the support body 21 over the rear portion 12 of the bumper beam 2 to the upper side portion 13 of the latter. The arm member 31 has a hat-like configuration defined by an upper flange 32 and a back side wall 33 at a front portion thereof and lower flanges 35, 35 at a back portion 34 thereof.

Next, a process for assembling the support 4 will be described with reference to FIG. 4.

Firstly, the arm member 31 is laid over the back portion of the support body 21 and weld connected thereto to complete the support 4. Specifically, the upper wall 22 of the support body 21 and the upper flange 32 of the arm member 31 are welded together.

Then, the side flanges 25, 25 of the support 4 are brought into contact with the rear portion 12 of the bumper beam 2, followed by weld connecting the side flanges 25, 25, lower flanges 26, 26 and arm member 31 to the bumper beam 2 to finish the assemblage operation.

The support 4 thus assembled is bolt connected to the front side of the side member 7.

It should be appreciated that the above-described assemblage process was given by way of example only and other arbitrary processes may also be employed.

Figure 5:
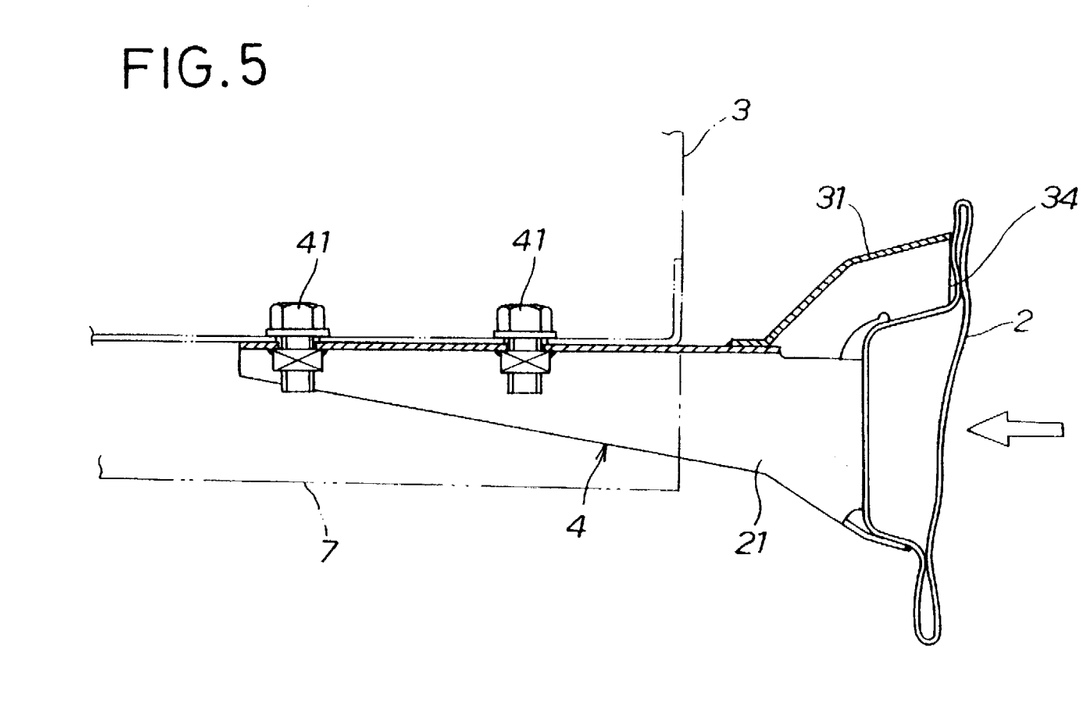
FIG. 5 is a schematic view illustrating the bumper beam deformed by a collision energy.

Operation of the above-described vehicular bumper mounting structure will now be discussed with reference to FIG. 3 and 5.

Under the conditions illustrated in FIG. 3, if a small collision energy arising from a collision at a low speed (approx. 8 km/hr or less) is applied from the back side of the vehicle to the bumper 1, the cushion 5 and the bumper beam 2 are elastically deformed to absorb the collision energy. The bumper beam 2 may not be plastically deformed by such small collision energy. In such instance, the cushion 5 and the bumper beam 2 restore their original shapes as the collision energy disappears.

When a large collision energy is exerted from the back side of the vehicle to the bumper 1, the bumper beam 2 is plastically deformed in correspondence with the magnitude of the collision energy. During the substantial deformation as shown in FIG. 5, the bumper beam 2 collides with the back end portion 34 of the arm member 31.

At this point in time, the collision energy is transmitted through the arm member 31 to the back portion of the support body 21. The collision energy is thus quickly and uniformly transmitted to the tip end of the side member 7. The collision energy transmitted to the side member 7 is absorbed by the vehicle body 3.

Figure 6A:
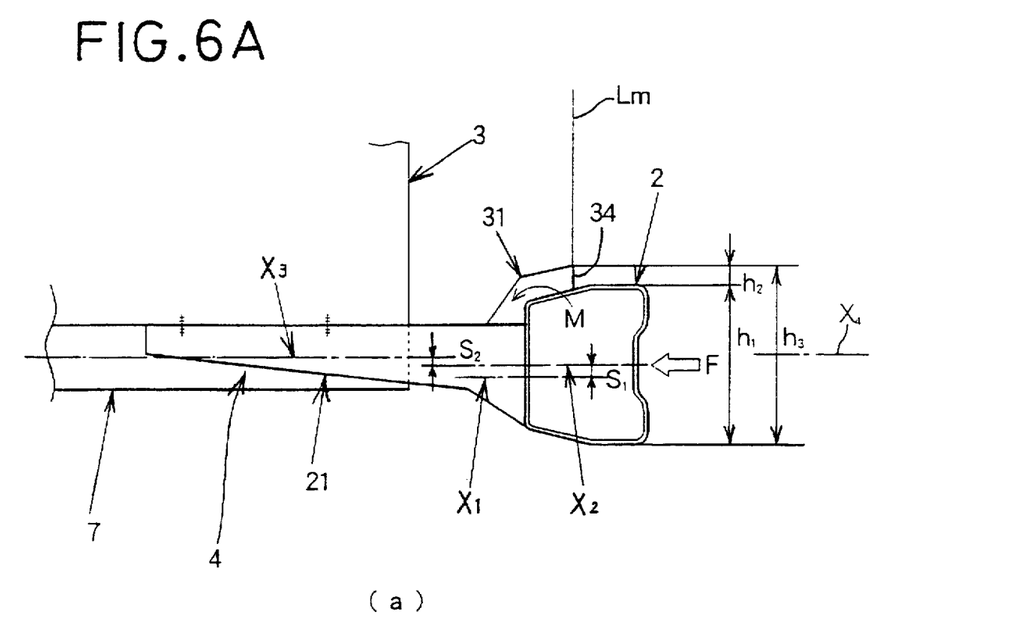
FIG. 6A is a schematic view illustrating the vehicular bumper mounting structure according to the present invention, with the bumper beam being mounted to a support body in an upwardly or downwardly offset relation thereto.
Figure 6B:
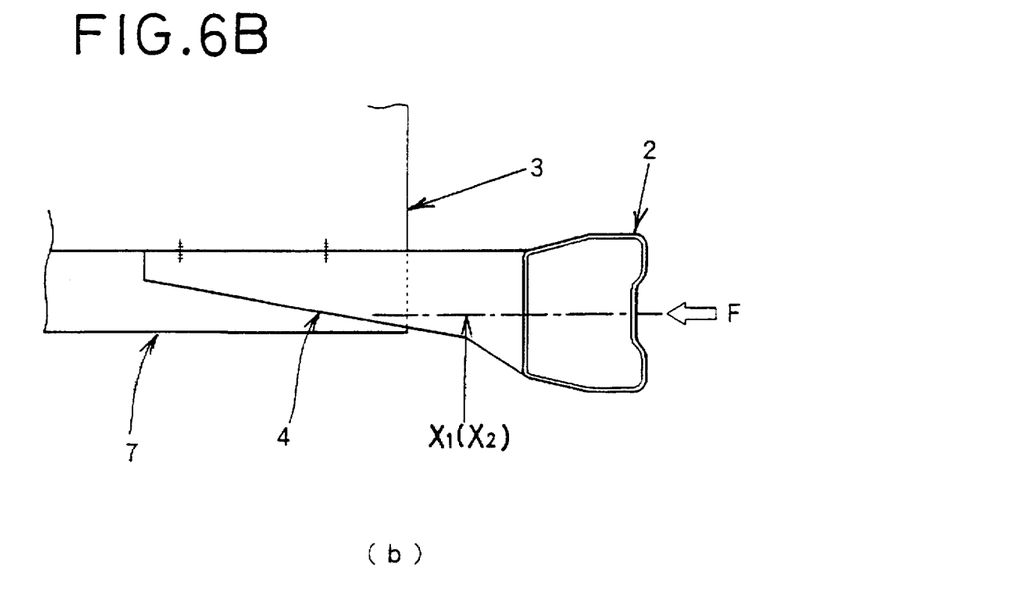
FIG. 6B is a view similar to FIG. 6A but showing the bumper mounting structure with the bumper beam being mounted to the support body in a non-offset relation thereto.

Referring to FIGS. 6A and 6B, discussion will now be made as to the operation of the bumper beam 2 being offset in a height direction relative to the support 4.

FIG. 6A is a schematic view of the vehicular bumper mounting structure according to the present invention. FIG. 6B schematically illustrates a comparative example of such vehicular bumper mounting structure.

As seen from the comparative example of FIG. 6B, if the center $X_1$ of the support 4 and the center $X_2$ of the bumper beam 2 are aligned, a moment may not be generated in the bumper beam 2 when the collision energy F is applied to the bumper beam 2. As a result, the collision energy F transmitted to the support 4 is transmitted to the vehicle body 3 quickly and efficiently.

If the bumper beam 2 is offset upwardly with respect to the support body 21 (by an offset dimension $S_1$), a moment M is generated in the bumper beam 2 when the collision energy F exerted to the bumper beam 2. Therefore, the support body 21 is required to have sufficient rigidity against the moment M so that it can transmit the collision energy to the vehicle body quickly and efficiently.

As explained above, in the present embodiment, the bumper beam 2 is offset upwardly relative to the support body 21 to provide a space between the back portion of the vehicle body 3 and the bumper beam 2. Using this space effectively, the arm member 31 is arranged to extend from the support body 21 to support the bumper beam 2, which is also supported by the support body 21, to thereby increase the rigidity of the support 4.

Further, since the support body 21 is combined with the arm member 31, it is possible to make the center of the entire support 4 and the center $X_2$ of the bumper beam 2 generally aligned. (The offset dimension $S_1$ can be kept small.) As a result, the large collision energy F exerted to the bumper beam 2 is received by both the back portion of the support body 21 and the arm member 31. This enables transmission of the collision energy F to the side member 7 quickly and efficiently notwithstanding the bumper beam 2 being offset in a height direction with respect to the support body 21.

Moreover, by changing the height H (see FIG. 3) of the back end portion 34 of the arm member 31, it becomes possible to adjust the height of the center $X_1$ of the support body 21 and the center $X_2$ of the bumper beam 2 relative to the center $X_3$ of the side member 7. This will be discussed in further detail below.

Referring to FIG. 6A, if the large collision energy F is exerted to the bumper beam 2, the bumper beam 2 deforms and bumps against the back end portion 34 of the arm member 31, whereupon the collision energy F is transmitted through the support 4 to the side member 7. Thus, the height relations of the center $X_1$ of the support body 21 and the center $X_2$ of the bumper beam 2 relative to the center $X_3$ of the side member 7 may be determined in light of the cross section of a line Lm passing through the back end portion 34 of the arm member 31. In other words, the apparent height of the bumper beam 2 is $h_3$ ($h_3=h_1+h_2$), where the height of the bumper beam 2 is $h_1$ and the height from the upper surface of the bumper beam 2 to the upper end of the arm member 31 is $h_2$. The center of the apparent height $h_3$ is $X_4$ which is positioned slightly above the actual center $X_2$ of the bumper beam 2. Thus, the center $X_4$ may be adjusted relative to the center $X_3$ of the side member 7 by changing the height $h_2$ of the arm member 31 and is preferably made to be aligned therewith. This will also be applied to the center $X_1$ of the support body 21.

It should be noted that the bumper 1 described in relation to the above embodiment should not be limited to the use as a rear bumper structure and may also be used as a front bumper structure.

In the above embodiment, the arm member 31 is laid over the upper surface of the back portion of the support body 21. It may also be arranged to lie on the lower surface of the support body 21.

As explained above, at least one of the support body 21 and the arm member 31 has at its back end portion an extension extending backwardly beyond the rear side portion 12 of the bumper beam 2. By simply changing the length L (see FIG. 3) of the extension of the back end portion of the support body 21 or the arm member 31, the collision energy transmission to the vehicle body 3 in a best timed relation is enabled.

Although the bumper beam 2 is described as being offset upwardly (in a height direction) relative to the side member 7, it may also be arranged to be offset downwardly relative to the side member 7. In the latter instance, the arm member 31 may be arranged to extend through a space provided below the support body 21 by the offsetting and to lie thereon.

Obviously, various minor changes and modifications of the present invention are possible in the light of the above teaching. It is therefore to be understood that within the scope of the appended claims the invention may be practiced otherwise than as specifically described.

What is claimed is:

1. A vehicular bumper mounting structure for mounting a bumper beam extending transversely of a vehicle to a side member of the vehicle by means of a support, comprising:

a bumper beam in the form of a closed hollow member of high tension steel;

a support having a support body and an arm member mounted to a bumper-mounting portion of one of an upper wall and a side wall of said support body in an overlapping relation thereto, said support having a flange mounted to at least one side portion of said bumper beam; and at least one of said support body and said arm member having at a side thereof proximate to said bumper beam a portion extending beyond a rear side portion of said bumper beam.

2. A vehicular bumper mounting structure comprising:

a support adapted to be mounted to a side member of a vehicle body;

a bumper beam in the form of a closed hollow member of high tension steel and adapted to be mounted to said support in either an upwardly or a downwardly offset relation thereto; and an arm member forming a part of said support and having a portion extending through a space provided adjacent said support by the offsetting of said bumper beam so that said portion of said arm member covers a part of said bumper beam at a distance and said bumper beam is also supported by said arm member.

3. A vehicular bumper mounting structure according to claim 2, wherein said arm member is formed separately from said support and attached thereto.

4. A vehicular bumper extending transversely of a vehicle and a structure for mounting one end of the bumper to a side member of the vehicle comprising:

a hollow bumper beam formed of high tension steel and having a rear side portion (12), an upper side portion (13), and a lower side portion (14), said bumper beam having a vertical center ($X_2$) equidistantly spaced between said upper side portion and said lower side portion;

a support having a front to rear longitudinally extending body (21) terminating in a vertical back portion (25, 25) and an arm member (31), said support body having a mounting surface (22) for attaching said support body to the side member (7) of the vehicle, said back portion (25, 25) of said support body being secured to said rear side portion of said bumper beam with said center ($X_2$) of said bumper beam vertically displaced from a vertical center ($X_1$) of said back portion (25, 25) of said support body (21) such that a part of said rear side portion (12) of said bumper beam and one of said upper side portion (13) and said lower side portion (14) of said bumper beam form a step relative to said mounting surface (22) of said support body (21), and said arm member traverses said step and is attached to said one of said upper side portion (13) and said lower side portion (14) of said bumper beam backwardly of said rear side portion (12) of said bumper beam.

5. A vehicular bumper and mounting structure according to claim 4 wherein said arm member is formed separately from said support body and attached thereto.

6. A vehicular bumper and mounting structure according to claim 4 wherein said rear side portion (12) of said bumper beam and said upper side portion (13) of said bumper beam form said step relative to said mounting surface of said support body and said arm member traverses said step and is attached to said upper side portion of said bumper beam backwardly of said rear side portion (12) of said bumper beam.

7. A vehicular bumper and mounting structure according to claim 4 wherein said support body is channel-shaped and said vertical back portion comprises a pair of side flanges (25, 25) provided at back ends of side walls (23, 23) of said channel-shaped support body.

8. A vehicular bumper and mounting structure according to claim 7, wherein a pair of edges (24, 24) are formed to project laterally from side walls (23, 23) of said channel-shaped support body and said edges (24, 24) provide a pair of flanges (26, 26) which project backwardly from said side flanges (25, 25) and are attached to the other one of said upper side portion (13) and said lower side portion (14) of said bumper beam.

* * * * *